F. W. SEECK.
DIFFERENTIAL MECHANISM.
APPLICATION FILED APR. 5, 1917.
1,278,231.
Patented Sept. 10, 1918.
2 SHEETS—SHEET 1.
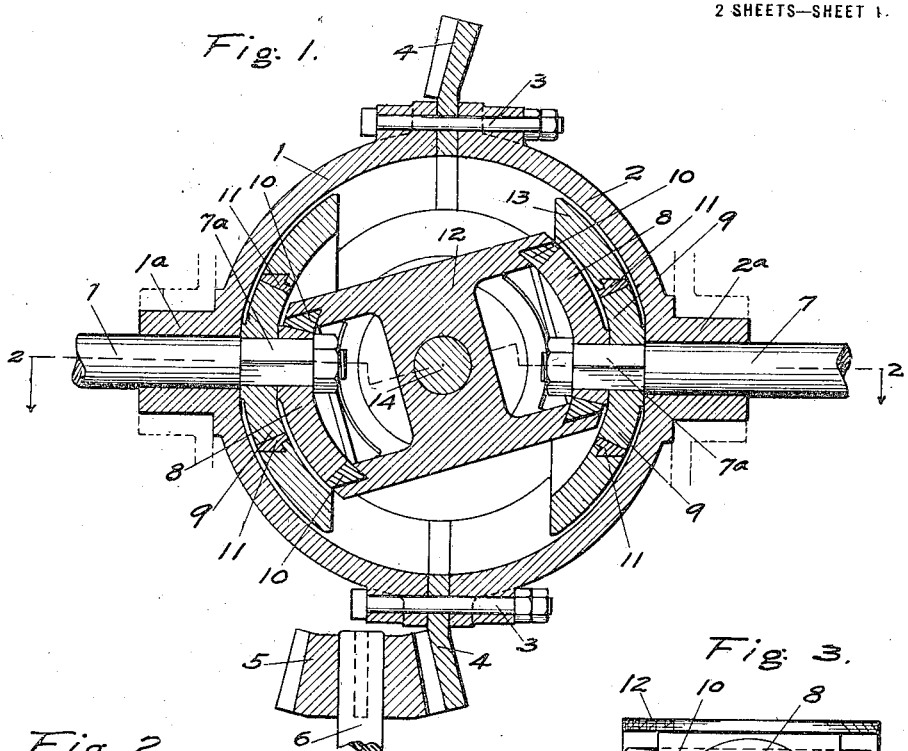
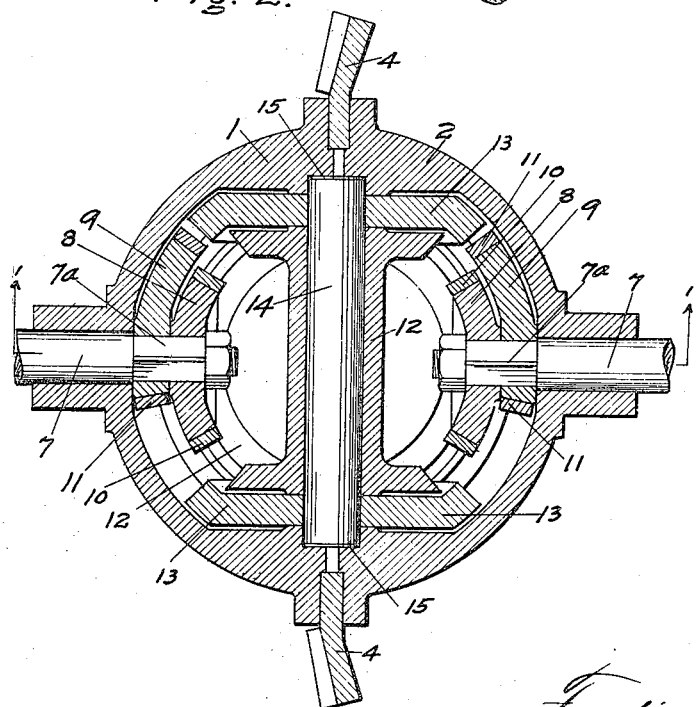
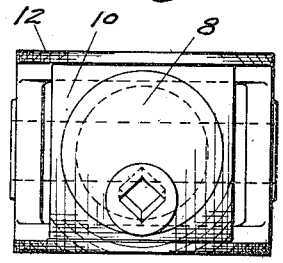
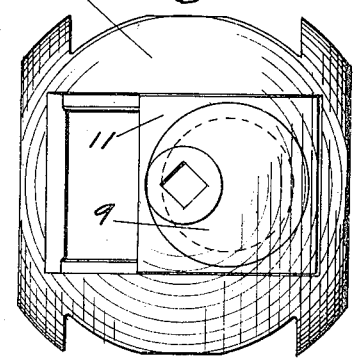

F. W. SEECK.
DIFFERENTIAL MECHANISM.
APPLICATION FILED APR. 5, 1917.

1,278,231.

Patented Sept. 10, 1918.
2 SHEETS—SHEET 2.

UNITED STATES PATENT OFFICE.

FERDINAND W. SEECK, OF LEBANON, OREGON.

DIFFERENTIAL MECHANISM.

1,278,231.

Specification of Letters Patent.    Patented Sept. 10, 1918.

Application filed April 5, 1917.   Serial No. 159,957.

*To all whom it may concern:*

Be it known that I, FERDINAND W. SEECK, a citizen of the United States, residing in the town of Lebanon, county of Linn, and State of Oregon, have invented certain new and useful Improvements in Differential Mechanisms, of which the following is a specification.

My invention relates to differential mechanisms, and more particularly to a differential driving mechanism by means of which power from one driven element can be transmitted to one or more other revoluble elements for the purpose of driving them together in the same direction at the same speed, or in opposite directions.

In order to illustrate my invention I have shown it embodied in the accompanying two sheets of drawings, in two different forms, which I will now describe.

Figure 1 is a sectional view taken on the line 1—1 of Fig. 2 of a gearless differential mechanism, the body of which, however, is driven by means of a gear ring and beveled gear;

Fig. 2 is a sectional view thereof taken on line 2—2 of Fig. 1;

Fig. 3 is an end elevation of an inner transmission member;

Fig. 4 is an end elevation of an outer transmisison member;

Figure 5:
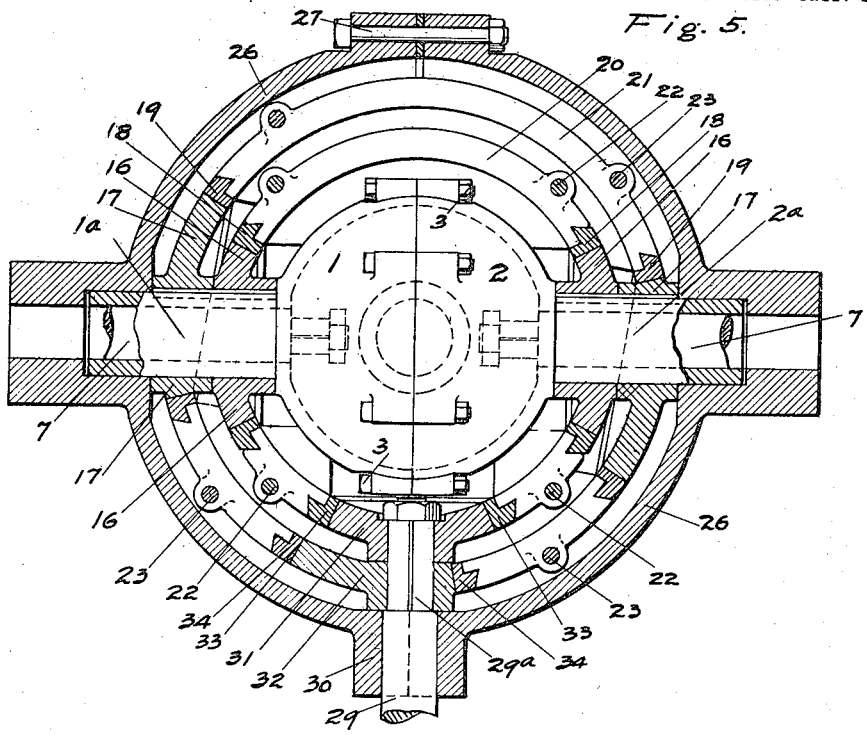
Fig. 5 is a horizontal sectional view through a combination gearless drive and differential mechanism, taken on line 5—5 of Fig. 6, with the inner differential housing shown in elevation.

Referring now more in detail to the drawings, my invention, as embodied in Figs. 1, 2, 3 and 4 thereof, comprises a housing, or casing, preferably made in halves, designated 1 and 2, secured together by bolts 3—3, with a beveled gear ring 4, therebetween, adapted to be driven from a beveled gear 5, on a driving shaft 6, said housing, or casing, having hub-like extensions 1ª and 2ª, supported in any suitable bearings, indicated in dotted lines. Rotatably mounted through said hub-like extensions 1ª—2ª, are two shafts, or axles, 7—7, having their inner ends made square, as at 7ª—7ª. Secured to said squared portions 7ª—7ª, within the housing 1—2, are concaved disks 8 and 9, eccentrically mounted upon the ends of said shafts, to turn therewith, which concaved disks are rotatably mounted, respectively, in sliding frames, as 10 and 11, slidably mounted, respectively, in the opposite ends of inner and outer transmission members 12 and 13, said transmission members being shown in sectional views in Figs. 1 and 2, and in end elevation views, respectively, in Figs. 3 and 4.

The inner transmission member is of a size which can be inserted into the outer transmission member 13, it being understood, of course, that said members are of such form that they will rock or oscillate relative to each other, one within the other, upon a pin 14, extending therethrough, and having its opposite ends seated in fixed seats, as 15—15, in opposite sides of the outer housing 1—2, as clearly shown in Fig. 2.

It will be understood from the foregoing description that when the shafts or axles 7—7, extended into the housing, or casing, 1—2, are turned relative to each other, the inner and outer transmission members 12 and 13, have a rocking or oscillating movement in opposite directions relative to each other on the pin 14, caused by the revolving of their respective disks 8 and 9, which are eccentrically mounted, and also due to the sliding movement of the slide frames 10 and 11, in the ends of said inner and outer transmission members 12 and 13. It will be evident, by reference to Figs. 3 and 4, that should the eccentrically mounted disks 8 and 9 be rotated, there would have to be an up and down movement of ends of the transmission members, and also a sliding movement of the slide frames 10 or 11, in the ends of said transmission members.

Therefore, if either of the shafts or axles 7—7, should be turned it would transmit to the other a similar movement in the opposite direction. On the other hand when the housing, or casing, 1—2, is driven by means of the beveled gear 5, and the gear ring 4, said shafts are driven together in the same direction, but either is free to turn relative to the other, as in turning a corner, in the usual manner of a differential.

It will be noted that the sliding frames 10 and 11, having a sliding interfitting connection at their edges in the ends of their respective transmission members, and that by reason of the radially shaped edges of the concave disks 8 and 9, they have a tapered fit into said sliding frames and cannot, therefore, be thrust inwardly through the frames and cannot come out of the said frames, because they bear one upon the other, and the outer one bears against the inner side of the housing 1—2. Parts, however, can easily be taken apart by opening the housing, as will be evident from the illustration of the construction shown.

In this embodiment of the invention I have a gearless transmission having an outer casing, or housing, 1—2, adapted to be driven from a power shaft 6, by means of the beveled gear 5, and the gear ring 4, the differential transmission members comprising the oscillating members 12 and 13, operated by means of eccentric disks, as before described.

Figure 6:
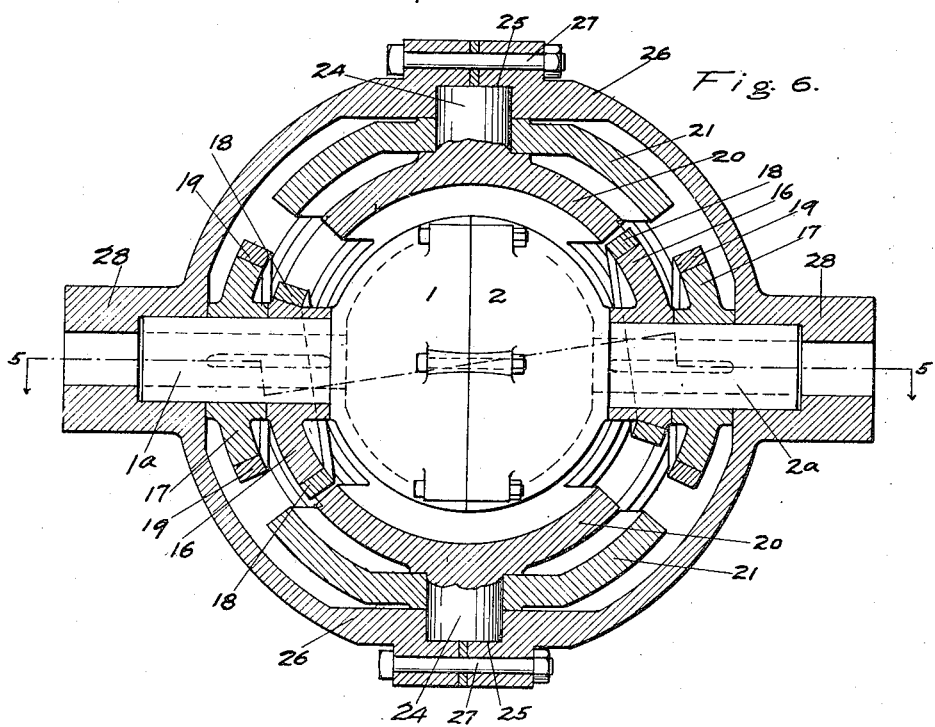
Fig. 6 is a vertical sectional view thereof.

In Figs. 5 and 6 I have shown the differential mechanism of Figs. 1 and 2, without the gear ring 4, mounted within and as a part of a combination gearless drive and differential, it being understood that the differential mechanism included in the housing or casing 1—2, of said Figs. 5 and 6, is the same as that shown in Figs. 1 and 2, but in these Figs. 5 and 6, I have illustrated a gearless drive to take the place of the beveled gear 5 and the gear ring 4, shown in Figs. 1 and 2.

In Figs. 5 and 6 the hub-like extensions 1ª and 2ª have keyed thereto inner and outer concaved disk-like members 16—16 and 17—17, eccentrically positioned on said hub-like extensions and rotatably mounted in sliding frames 18—18, and 19—19, slidably mounted in the ends of inner and outer transmission members 20 and 21, similar to the transmission members 12 and 13, shown in Figs. 1 and 2, except that said transmission members 20 and 21, are each made in halves and are secured together by means of bolts 22 and 23. The inner transmission member 20 is provided on its opposite sides with trunnion-like members 24—24, which pass through the outer transmission members 21, and is seated, as at 25—25, in the opposite sides of an outer casing or housing 26, also made in two parts secured together by means of bolts 27—27. Said outer casing has hub-like extensions 28—28, formed thereon, within which the ends of the hub-like extensions 1ª and 2ª, of the inner housing, or casing, 1—2, have bearings. A driving shaft 29, has a bearing through a hub-like portion 30, of said outer casing or housing 26, and is provided on its inner end with a squared portion 29ª, upon which is eccentrically mounted two concaved driving disk-members 31 and 32, rotatably mounted in slide frames 33 and 34, slidably mounted, respectively, in the inner and outer transmission members 20 and 21 in the same manner as are the slide members 10 and 11, slidably mounted in the transmission members 12 and 13, of Figs. 3 and 4. Thus by driving the shaft 29, which projects radially into the casing 26, it operates through its eccentrics 31 and 32, and their slide frames 33 and 34, in the inner and outer transmission members 20 and 21, to drive the inner casing or housing 1—2, because of the fact that said inner and outer transmission members 20 and 21, through the eccentric disks 16 and 17, are connected to the hub-like extensions 1ª and 2ª, of said inner housing, said disks 16 and 17 being keyed to said hub-like extensions 1ª and 2ª. The axles, or shafts 7—7, project into the inner housings 1—2, in the same manner as shown in Figs. 1 and 2, and are connected by the same differential mechanism, as shown and described in Figs. 1 and 2.

Thus I have provided a combination gearless drive with a gearless differential mechanism forming a part thereof.

I am aware that changes in the details of my invention as here shown and described can be made without departing from the spirit thereof, and I do not, therefore, limit the invention to the embodiment thereof here shown for purposes of illustration, except as I may be limited by the hereto appended claims.

I claim:

1. In a differential mechanism of the character referred to, in combination, outer and inner transmission members mounted to oscillate one within the other, cam disks revolubly mounted in the corresponding opposite sides of each of said transmission members, and two shafts inserted into the opposite sides of said transmission members, eccentrically through their disks, substantially as described.

2. In a differential mechanism of the character referred to, in combination, a casing, outer and inner transmission members mounted to oscillate one within the other within said casing, a pivot pin extending transversely through said transmission members intermediate their ends and connected at its opposite ends in said casing, cam disk members revolubly mounted in the opposite adjacent ends of said transmission members, and a shaft inserted eccentrically through the adjacent disks at each end of said outer and inner transmission members, substantially as described.

3. In a differential mechanism of the character referred to, in combination, outer and inner transmission members mounted to oscillate one within the other, bearing frames slidably mounted in the opposite sides of each of said transmission members, cam disks revolubly mounted in said bearing frames, and two shafts inserted into the opposite sides of said transmission members, eccentrically through their disks, substantially as described.

4. In a differential mechanism of the character referred to, in combination, outer and inner transmission members mounted to oscillate one within the other, a pivot pin extending transversely through said transmission members, bearing frames slidably mounted in the opposite ends of each of said transmission members, cam disk members revolubly mounted in said bearing frames, and a shaft inserted eccentrically through the adjacent disks at each end of said outer and inner transmission members, substantially as described.

5. A differential mechanism of the character referred to comprising in combination, an outer casing, two shafts having their ends extended into said casing, two transmission members mounted to oscillate one within the other within said casing, and two eccentrically mounted cam disks secured to the inner end of each of said shafts and revolubly connected, respectively, to said inner and outer transmission members, whereby the turning of said shaft and said cam disks causes said transmission members to oscillate in opposite directions one within the other.

6. A differential mechanism of the character referred to comprising in combination an outer casing with means for revolving the same, a pair of shafts extended into the opposite sides of said casing, two transmission members mounted to oscillate in opposite directions, one within the other within said outer casing, a pivot pin through said transmission members, and two cam disk members eccentrically secured to the inner end of each of said shafts and revolubly seated respectively, in the adjacent ends of said transmission members, whereby the turning of either of said shafts in said outer casing operates through said eccentric cam disks to oscillate said transmission members in opposite directions, substantially as described.

7. A differential mechanism of the character referred to comprising in combination an outer casing with means for revolving the same, a pair of shafts extended into the opposite sides of said casing, two transmission members mounted to oscillate in opposite directions, one within the other, within said outer casing, a pivot pin extended transversely through said transmission members and seated in the opposite sides of said outer casing, bearing frames slidably mounted in the opposite ends of said inner and outer transmission members, and two cam disk members eccentrically secured to the inner end of each of said shafts and revolubly seated, respectively, in the bearing frames slidably mounted in the adjacent ends of said inner and outer transmission members, whereby the turning of either of said shafts in said outer casing operates through said eccentric cam disks to oscillate said transmission members in opposite directions, substantially as described.

8. A differential mechanism comprising in combination an outer casing, a plurality of shafts extended radially into said outer casing, and driving means for said shafts within said outer casing comprising a pair of cam disks mounted eccentrically upon the end of each of said shafts, and transmission members mounted one within the other, said cam disks being revolubly seated in adjacent sides of said transmission members and forming wall portions thereof, whereby the turning of one of said shafts relative to the other operates through its eccentric cam disks and said transmission members to turn the other, substantially as described.

9. A combination gearless drive and differential mechanism comprising in combination an inner casing having bearing trunnions on its opposite sides, shafts extended through said bearing trunnions into said inner casing, connecting means between the inner ends of said shafts comprising inner and outer transmission members mounted to oscillate one within the other, eccentric cam disks connecting said transmission members at their opposite ends to the inner ends of said shafts, said disks being secured to said shafts and revolubly seated in the ends of said transmission members, and a pivot pin through said transmission members and having bearings at its opposite ends in said inner casing, means for revolving said inner casing comprising an outer casing within which said inner casing is mounted and having trunnion bearings to receive the trunnions of said inner casing, eccentric cam disks secured to the trunnions of said inner casing within said outer casing, a drive shaft extended into said outer casing, a pair of eccentric cam disks thereon, inner and outer transmission members and bearing slide frames in their sides in which the eccentric cam disks of said drive shaft and of said trunnions on said inner casing are seated, whereby said inner casing and the shafts extending thereinto can be turned by means of said driving shaft, its eccentric cam disks and the inner and outer transmission members between said inner and outer casing, substantially as described.

Signed at Lebanon, Linn county, Oregon, this 28th day of March, 1917.

FERDINAND W. SEECK.

In presence of—
 LESLIE B. KENT.
 MENZA L. SOUTHARD.